US012344017B2

(12) United States Patent
Schiestl

(10) Patent No.: US 12,344,017 B2
(45) Date of Patent: Jul. 1, 2025

(54) PRINTING MACHINE AND METHOD FOR PRINTING TEXTILES

(71) Applicant: Angelo Schiestl, Langkampfen (AT)

(72) Inventor: Angelo Schiestl, Langkampfen (AT)

( * ) Notice: Subject to any disclaimer, the term of this patent is extended or adjusted under 35 U.S.C. 154(b) by 220 days.

(21) Appl. No.: 17/604,963

(22) PCT Filed: Mar. 17, 2020

(86) PCT No.: PCT/EP2020/057313
§ 371 (c)(1),
(2) Date: Oct. 19, 2021

(87) PCT Pub. No.: WO2020/229024
PCT Pub. Date: Nov. 19, 2020

(65) Prior Publication Data
US 2022/0203708 A1 Jun. 30, 2022

(30) Foreign Application Priority Data
May 14, 2019 (EP) .................................... 19174409

(51) Int. Cl.
*B41J 3/407* (2006.01)
*B41J 11/00* (2006.01)
(Continued)

(52) U.S. Cl.
CPC ......... *B41J 3/4078* (2013.01); *B41J 11/0024* (2021.01); *D06B 11/0056* (2013.01); *D06B 11/0089* (2013.01); *D06C 15/10* (2013.01)

(58) Field of Classification Search
None
See application file for complete search history.

(56) References Cited

U.S. PATENT DOCUMENTS

2005/0179708 A1* 8/2005 Ben-Zur ................ B41J 11/002 347/4
2015/0273866 A1* 10/2015 Sakai .................. B41J 11/0024 347/21
(Continued)

FOREIGN PATENT DOCUMENTS

EP 2 130 680 A1 12/2009
EP 2130680 B1 * 9/2012 .......... B41J 11/0015
(Continued)

OTHER PUBLICATIONS

International Search Report issued in PCT/EP2020/057313; mailed May 27, 2020.
(Continued)

*Primary Examiner* — Joshua D Zimmerman
(74) *Attorney, Agent, or Firm* — Studebaker Brackett PLLC

(57) ABSTRACT

The invention relates to a printing machine and a method for printing textiles with a machine bed, at least one conveying means arranged on the machine bed for conveying at least one textile along a processing path, at least one priming means arranged on the machine bed for applying a primer in a planar manner on a motif region of the textile, on which a print motif is to be provided, and at least one printing means arranged on the machine bed and having at least one digital print head for printing the print motif. In accordance with the invention provision is made in that along the processing path between the priming means and the printing means at least one pressing means is arranged which is designed for pressing the motif region with the applied primer.

15 Claims, 1 Drawing Sheet

(51) Int. Cl.
*D06B 11/00* (2006.01)
*D06C 15/10* (2006.01)

(56) References Cited

U.S. PATENT DOCUMENTS

| | | | | |
|---|---|---|---|---|
| 2018/0215171 | A1* | 8/2018 | Schiestl | B41J 11/06 |
| 2019/0100033 | A1* | 4/2019 | Tamaki | B41J 11/00 |
| 2020/0407574 | A1* | 12/2020 | Contractor | B41M 5/0017 |

FOREIGN PATENT DOCUMENTS

| | | | |
|---|---|---|---|
| EP | 3 121 015 | A1 | 1/2017 |
| EP | 3 121 016 | A1 | 1/2017 |
| EP | 3 427 962 | A1 | 1/2019 |
| EP | 3 461 646 | A1 | 4/2019 |

OTHER PUBLICATIONS

International Preliminary Report On Patentability (Chapter II) issued in PCT/EP2020/057313; completed Jul. 30, 2021.

* cited by examiner

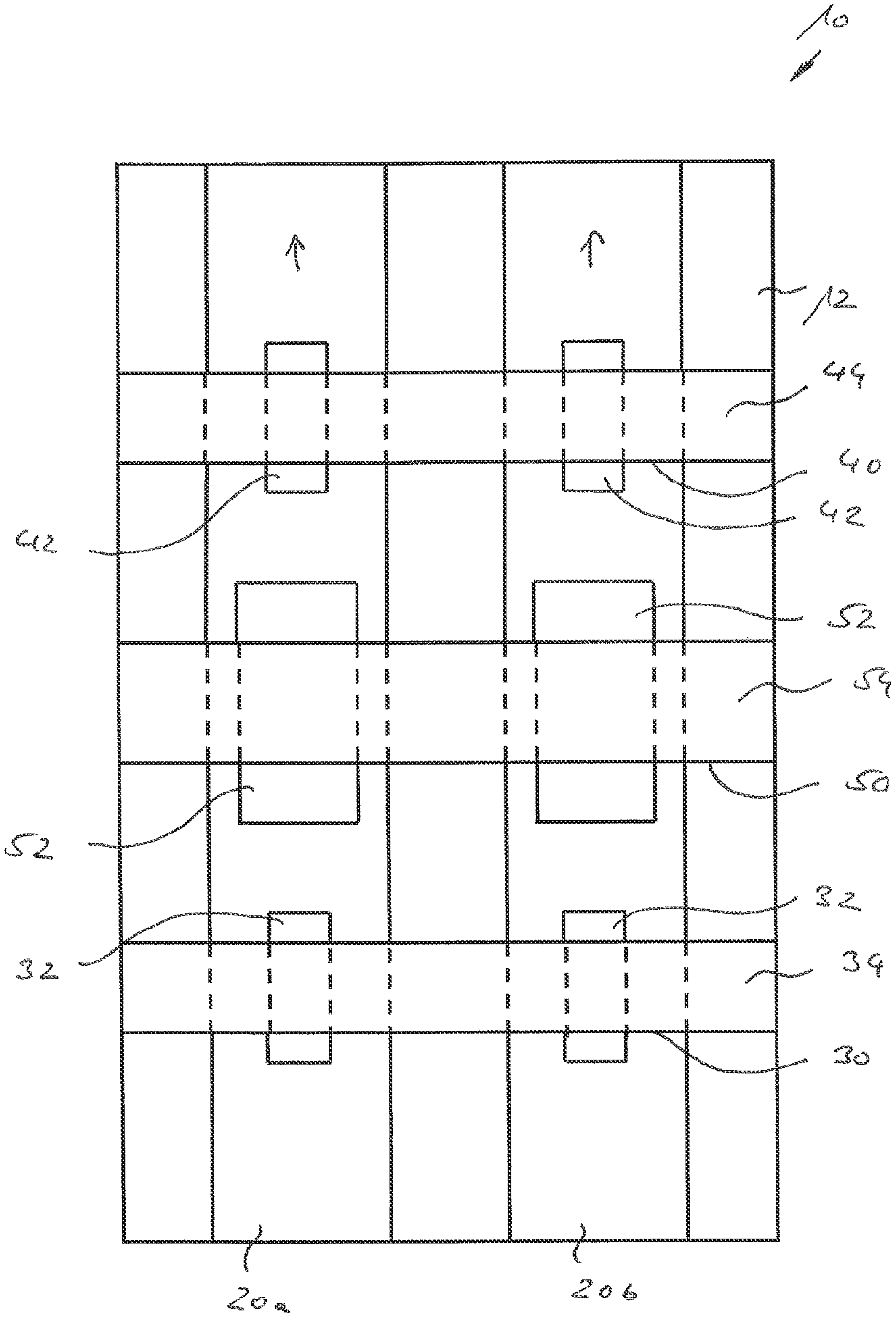
10
12
44
40
42
42
52
54
50
52
32
32
34
30
20a
20b

PRINTING MACHINE AND METHOD FOR PRINTING TEXTILES

The invention relates to a printing machine for printing textiles with a machine bed, at least one conveying means arranged on the machine bed for conveying at least one textile along a processing path, at least one priming means arranged on the machine bed for applying a primer in a planar manner on a motif region of the textile, on which a print motif is to be provided, and at least one printing means arranged on the machine bed and having at least one digital print head for printing the print motif, in accordance with the preamble of claim 1.

The invention further relates to a method for printing textiles, in particular with such a printing machine, in which at least one textile is conveyed by means of at least one conveying means on a machine bed along a processing path, along the processing path on at least one priming means at least one primer is applied in a planar manner onto the textile on a motif region of the textile, onto which a print motif is to be applied, and on at least one printing means along the processing path the primed motif region is printed by at least one digital print head in order to form the print motif, in accordance with the preamble of claim 7.

Generic printing machines can be taken from EP 3 427 962 A1 or EP 2 130 680 A1 for example.

When printing a textile it is generally known that before application of the printing ink a pretreatment with a pretreatment fluid is carried out. Basically, the pretreatment fluid is not ink but preferably a transparent liquid that serves to penetrate into the fibers of the textile fabric and pretreat these in such a way that an undesired bleeding of the printing inks to be applied subsequently is counteracted. The pretreatment usually takes place in a separate station, by preference on a separate machine. In this, after a pretreatment fluid has been sprayed on the textile is dried under the influence of heat which can be realized by means of heat radiators or heating plates.

Furthermore, especially when printing colored textiles, in particular black ones, it is known that before application of the actual print motif a primer, in particular a white color, is applied. In a digital printing machine the application of the primer can take place with the same print head as used for the subsequent colors or with a separate print head.

Moreover, it is generally known that on completion of the printing process the applied print motif is fixed, in particular under the influence of heat. For this purpose, it is also known that heat radiators or heating plates are used for the final processing step.

The objective in printing textiles is to apply a print motif onto the three-dimensional fabric structure of the textile that is as precise and sharp-contoured as possible.

The invention is based on the object to provide a printing machine and a method for printing textiles, with which a print motif can be applied onto a textile in a particularly efficient manner at a high quality level.

The object is achieved on the one hand by a printing machine having the features of claim 1 and on the other hand by a method having the features of claim 7. Preferred embodiments of the invention are stated in the dependent claims.

The printing machine according to the invention is characterized in that along the processing path between the priming means and the printing means at least one pressing means is arranged which is designed for pressing the motif region with the applied primer, and in that by means of the at least one conveying means the textile can be transported from the priming means to the pressing means and from the pressing means to the printing means.

A basic idea of the invention can be seen in a primer being applied in a priming means and subsequently being pressed in a pressing station prior to a printing with the actual print motif. Through this, a smoothed motif region can be produced in particular on a partial region of the textile. In this motif region the three-dimensional structure of the textile fabric can be leveled out and evened out to a considerable degree as a result of the applied primer and a previous and/or subsequent pressing so that afterwards the actual print motif can be applied onto this evened out motif region. Due to the fact that the macroscopic three-dimensional fabric structure is reduced or even eliminated to a large extent in the motif region the print motif can be applied with particularly high precision and contour sharpness. In addition, the step of pressing the primer before printing increases the durability of the applied print motif.

Basically, the pressing in the printing machine can be carried out with any suitable pressing means, e.g. with a pressing roller. According to an embodiment of the invention it is especially preferred that the pressing means has at least one press plate which can be heated. The press plate has a size that corresponds at least to the size of the motif region. By preference, the press plate can be heated to a defined pressing temperature which ranges, in particular, between 60° C. and 150° C. depending on the primer used. The textile is preferably clamped and pressed between a lower press or base plate and an upper press plate.

Through the pressing by means of a press plate a particularly uniform and plane structure of the motif region is achieved even in a relatively coarse fabric. Moreover, especially in the case of multifilament fibers, in particular fibers with natural components or natural fibers, in particular a cotton or cotton-blend fabric, an additional smoothing or pressing-on of fine fiber filaments can be attained which protrude from the natural fibers even when a pretreatment with a pretreatment fluid has been carried out beforehand. Due to the heating an especially good smoothing and in addition a rapid drying of the primer is achieved. A pressing by means of an additional pressing means can also be carried out before priming.

A preferred embodiment of the printing machine according to the invention resides in the fact that the priming means has at least one application nozzle for applying the primer. The one or several application nozzles can be arranged in a print head that extends statically over the motif region of the textile to be primed or is displaceable in a direction transverse to the movement direction of the textile.

Basically, the at least one conveying means can have a single pallet or several pallets which each receive one textile and are moved in a linearly reciprocating or circulating manner along the processing path. A particularly preferred embodiment variant of the invention can be seen in the fact that at least two parallel, adjacent conveying means are provided and in that for each conveying means the at least one priming means and/or the at least one printing means have the same position in relation to the respective processing path. The conveying means can in this case also have pallets moved in a linearly reciprocating manner or circulating conveyor belts. In such a twin arrangement with two adjacent conveying means an efficient deployment of personnel as well as an efficient utilization of the processing units at the priming means or the printing means can be achieved.

In this connection, it is particularly advantageous that above the conveying means the adjacent priming means and/or printing means each have a joint guide beam, along which application nozzles for the primer and/or print heads of the printing means are displaceably supported in a direction transverse to the processing path. The application nozzles and/or the print heads are supported in such a way on a respective joint guide beam that they are basically able to process a textile both on the first conveying means and on the second conveying means. This permits an especially efficient utilization of the processing units and also allows a further operation of the printing machine even if e.g. a print head failed on one of the conveying means since this function can also be executed by the second print head on the conveying means.

A preferred embodiment of the invention resides in the fact that the priming means and the printing means are designed in one station. Thus, the priming means and the printing means can be designed at the same location, while the pressing means is spaced apart therefrom. Initially, the textile is provided with a primer by the priming means, with the textile thus processed being conveyed by the conveying means to the pressing means. Afterwards, the textile is conveyed back to the first processing location where the textile is then printed by the printing means. The primer can be applied by the same print heads that are also provided for the printing inks.

With regard to the method the invention is characterized in that before printing of the print motif the primed motif region of the textile is pressed by means of at least one pressing station which is arranged between the at least one priming means and the at least one printing means.

The method can in particular be carried out by the previously described printing machine according to the invention. The advantages set out beforehand with regard to the application of the print motif at a high quality level can be achieved thereby.

Basically, the primer can be selected depending on a basic color of the textile to be printed. The priming serves the purpose that an intense basic color of the textile does not affect the colors of the print motif that is to be printed. A particularly advantageous embodiment of the invention resides in the fact that the primer is white. In this way, a basic color of the textile, even a black color, can be covered reliably.

According to the method pursuant to the invention the primer is applied with a layer thickness that can range between 10 μm and 500 μm. In particular, through a primer filaments protruding from the fibers are covered and embedded in the applied primer layer at least during the subsequent pressing. The primer can only extend on an upper side of the fibers and threads of the motif region of the textile. In the case of a corresponding application quantity the primer can also cover the pores or mesh openings of the textile as a whole so that a largely closed area is then formed. All in all, after pressing the motif region can thus form a plane area that is free of mesh openings or still has exposed mesh openings.

In any case, an advantageous embodiment of the method according to the invention resides in the fact that during pressing onto the motif region of the textile the applied primer forms a continuous base area which preferably is plane. The base area has a plane surface that is printed.

Furthermore, according to an embodiment variant of the method according to the invention it is advantageous that before application of the primer the motif region is pretreated with a treatment medium to a lesser extent than the extent of a pretreatment for the direct application of a printing ink. The textile is preferably pretreated with a pretreatment fluid, in which case only about a third to a half of the pretreatment fluid is required as compared to a regular textile printing process. A reason for this can be seen in the fact that the primer also contributes to the sealing of the individual fibers and therefore a bleeding of the printing inks through the fiber structure is counteracted. Basically, in the case of a corresponding application of the primer it is also possible that a pretreatment with a pretreatment fluid is dispensed with altogether.

Moreover, it is preferred that several printing inks are printed, of which one printing ink is white. In the method according to the invention a white primer can thus be applied by the priming means. After pressing a white printing ink can be applied subsequently which ensures a so-called highlighting in the motif region.

The pressing of the motif region of the textile after priming and before the actual printing can basically take place in any chosen way, for instance by means of pressing rolls. According to a further development of the invention it is especially preferred that the pressing takes place with a press plate which is heated to a defined temperature range. The press plate has a plane contact area that is preferably provided with a corresponding coating against the adhesion of ink. Below the textile a corresponding counter-bearing or base plate can be provided that is not heated or is also heated. The press plate applied from above onto the print motif is preferably heated electrically to a temperature range between 60° C. and 150° C. In this way, not only is a good smoothing of the applied primer layer but also a rapid drying and curing of the primer achieved.

The invention is explained further hereinafter by way of a preferred embodiment illustrated schematically in the accompanying drawing. The drawing shows a schematic plan view of a printing machine according to the invention.

In the single FIGURE a printing machine 10 according to the invention with a machine bed 12 that is rectangular in plan view is illustrated. On the machine bed 12 in a longitudinal direction thereof two adjacent, belt-shaped conveying means 20*a*, 20*b* are arranged parallel to each other. To transport a textile, for example a T-shirt, the conveying means 20 are movable from a front infeed region in a movement or processing direction, which is indicated by an arrow in each case, to an end or removal region. Along the processing path the textiles to be processed and located on the conveying means 20 initially reach a priming means 30. The priming means 30 has a portal-like guide beam 34 that is arranged above the conveying means 20 on the machine bed 12. On an underside of the guide beam 34 a first application head 32 for the first conveying means 20*a* and a second application head 32 for the second conveying means 20*b* are arranged for applying a primer onto a motif region of the textile.

The application heads 32 are designed with one or several application nozzles that are directed downwards to the textile. The application heads 32 are displaceably supported along the guide beam 34 in a direction transverse to the conveying direction or the processing path of the textile. The application heads 32 can thus cover the entire width of the conveying means 20 and apply the primer in this region. In addition, the application head 32 of the first conveying means 20*a* can be displaced as far as over the second conveying means 20*b* to replace or assist, where necessary, the application head 32 provided there.

After application of a primer the textile with the primed motif region is conveyed further in the conveying direction to a pressing means 50. On the pressing means 50 a height-adjustable press plate 52 is arranged for each conveying means 20, which can preferably be pushed by a pneumatic or hydraulic cylinder from an upper retracted position into a lower processing position, in which the press plate 52 is pressed onto an upper side of the textile on the conveying means 20. The press plates 52 can also be supported on a portal-like guide beam 54 above the conveying means 20 on the machine bed 12. By preference, the press plates 52 are heated electrically so that the motif region on the textile provided with the primer can be pressed and dried at the same time. Before priming the motif region can be pressed and additionally smoothed by the pressing means 50 or another pressing means connected upstream.

According to the invention, in the pressing station 50 a particularly plane motif region can also be produced on a coarsely woven textile. Afterwards, the textile is conveyed onwards by means of the conveying means 20 to one or several printing means 40. In the illustrated embodiment the printing machine 10 only has a single printing means with a portal-like guide beam 44 supported above the conveying means 20 on the machine bed 12.

Similar to the design of the priming means 30, on an underside of the guide beam 44 of the printing means 40 two print heads 42 with printing nozzles are arranged, through which a print motif can be applied in a generally known manner onto the motif region of the textile through digital activation of the printing nozzles. The print heads 42 are also adjustable along the guide beam 44 in a direction transverse to the processing path of the textile so that a print head 42 for the first conveying means 20*a* can replace the print head 42 for the second conveying means 20*b*. Conversely, the print head 42 of the second conveying means 20*b* can also replace or assist the print head 42 of the first conveying means 20*a*.

The invention claimed is:

1. A printing machine for printing textiles that have a basic color, comprising a machine bed, at least one conveyor arranged on the machine bed for conveying at least one textile along a processing path, at least one priming applicator arranged on the machine bed for applying a primer in a planar manner on a motif region of the textile, on which a print motif is to be provided, wherein the primer covers the basic color of the textile, and at least one printer arranged on the machine bed and having at least one digital print head for printing the print motif, wherein the priming applicator is configured to apply the primer with a layer thickness ranging between 10 μm and 500 μm, along the processing path between the priming applicator and the printer, at least one pressing station is arranged for pressing the motif region and thus, together with the priming applicator, is configured for leveling out and evening out the three-dimensional structure of the textile with the applied primer and a previous pressing, thereby covering primer pores and mesh openings of the textile and forming a closed area of the motif region, and in that the at least one conveyor transports the textile between the priming applicator and the pressing station and between the pressing station and the printer.

2. The printing machine according to claim 1, wherein the pressing station has at least one press plate which can be heated.

3. The printing machine according to claim 1, wherein the priming applicator has at least one application nozzle for applying the primer.

4. The printing machine according to claim 1, wherein at least two parallel, adjacent conveyors are provided and for each conveyor, the at least one priming applicator and/or the at least one printer have a same position in relation to the respective processing path.

5. The printing machine according to claim 4, wherein above the conveyor, the adjacent priming applicator and/or printer each have a joint guide beam, along which application nozzles for the primer and/or print heads of the printer are displaceably supported in a direction transverse to the processing path.

6. The printing machine according to claim 1, wherein the priming applicator and the printer are designed in one station.

7. A method for printing textiles that have a basic color with a printing machine according to claim 1, comprising conveying at least one textile on at least one conveyor on a machine bed along a processing path, applying a primer in a planar manner along the processing path with at least one priming applicator onto a motif region of the textile, onto which a print motif is to be applied, wherein the primer covers the basic color of the textile, and printing the print motif on the primed motif region with at least one digital print head of at least one printer along the processing path, wherein the primer is applied to the motif region with a layer thickness ranging between 10 μm and 500 μm, after application of the primer and before printing of the print motif, the motif region of the textile is evened out by pressing at least one pressing station onto the motif region to level out and even out the three-dimensional structure of the textile through the applied primer and a previous pressing so that the print motif can be applied onto the evened out motif region, and the pressing station is arranged between the priming applicator and the at least one printer, thereby covering primer pores and mesh openings of the textile and forming a closed area of the motif region.

8. The method according to claim 7, wherein the primer is white.

9. The method according to claim 7, wherein during pressing onto the motif region of the textile, the applied primer forms a continuous planar base area.

10. The method according to claim 7, wherein more than one printing inks are printed, of which one printing ink is white.

11. The method according to claim 7, wherein the pressing is performed with a press plate which is heated to a defined temperature range.

12. The printing machine according to claim 2, wherein the at least one press plate has a plane contact area that is provided with a coating against the adhesion of ink.

13. The method of claim 11, wherein the press plate has a plane contact area that is provided with a coating against the adhesion of ink.

14. The printing machine according to claim 2, wherein the at least one press plate is configured to be electrically heated to a temperature range of between 60° C. and 150° C.

15. The method according to claim 11, wherein the press plate is configured to be electrically heated to a temperature range of between 60° C. and 150° C.

* * * * *